US006901300B2

(12) United States Patent
Blevins et al.

(10) Patent No.: US 6,901,300 B2
(45) Date of Patent: May 31, 2005

(54) ADAPTATION OF ADVANCED PROCESS CONTROL BLOCKS IN RESPONSE TO VARIABLE PROCESS DELAY

(75) Inventors: Terrence L. Blevins, Round Rock, TX (US); Wilhelm K. Wojsznis, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 419 days.

(21) Appl. No.: 10/072,029

(22) Filed: Feb. 7, 2002

(65) Prior Publication Data

US 2003/0149493 A1 Aug. 7, 2003

(51) Int. Cl.$^7$ ............................................. G05B 13/02
(52) U.S. Cl. .............................. 700/46; 700/7; 700/18; 700/28; 700/48; 700/54; 700/55; 700/71; 700/72
(58) Field of Search .............................. 700/28, 29, 32, 700/37, 53, 54, 55, 7, 18, 48, 71–72, 46

(56) References Cited

U.S. PATENT DOCUMENTS

| 4,054,780 A | * | 10/1977 | Bartley et al. ................. 700/30 |
|---|---|---|---|
| 4,358,822 A | | 11/1982 | Sanchez ..................... 364/151 |
| 5,268,835 A | | 12/1993 | Miyagaki et al. ........... 364/151 |
| 5,283,729 A | | 2/1994 | Lloyd .......................... 364/157 |
| 5,301,101 A | | 4/1994 | MacArthur et al. ......... 364/156 |
| 5,347,446 A | | 9/1994 | Iino et al. .................... 364/149 |
| 5,351,184 A | | 9/1994 | Lu et al. ...................... 364/165 |
| 5,353,207 A | | 10/1994 | Keeler et al. ................ 364/164 |
| 5,384,698 A | | 1/1995 | Jelinek ........................ 364/149 |
| 5,386,373 A | | 1/1995 | Keeler et al. ................ 364/577 |
| 5,408,406 A | | 4/1995 | Mathur et al. ............... 364/163 |
| 5,453,925 A | | 9/1995 | Wojsznis et al. ............ 364/157 |
| 5,457,625 A | | 10/1995 | Lim et al. .................... 364/149 |
| 5,477,449 A | | 12/1995 | Iino ............................. 364/149 |
| 5,517,424 A | | 5/1996 | Marcelle et al. ............. 364/494 |
| 5,539,638 A | | 7/1996 | Keeler et al. ............ 364/424.03 |
| 5,548,528 A | | 8/1996 | Keeler et al. ................ 364/497 |
| 5,559,690 A | | 9/1996 | Keeler et al. ................ 364/164 |
| 5,568,378 A | | 10/1996 | Wojsznis ..................... 364/164 |
| 5,572,420 A | | 11/1996 | Lu ............................... 364/153 |
| 5,586,221 A | | 12/1996 | Isik et al. ...................... 395/22 |
| 5,587,897 A | | 12/1996 | Iida ............................. 364/148 |

(Continued)

FOREIGN PATENT DOCUMENTS

| EP | 0 524 317 A1 | 1/1993 | .......... G05B/13/04 |
|---|---|---|---|
| EP | 0 588 594 A2 | 3/1994 | .......... G05B/13/02 |
| GB | 2 355 545 A | 4/2001 | .......... G05B/13/04 |

OTHER PUBLICATIONS

Brochure entitled "Advanced Control and Optimization, Capturing and Sustaining Maximum Client Benefits" from Aspen Technology, Inc. of Cambridge, MA, copyright 1996.

(Continued)

*Primary Examiner*—Anthony Knight
*Assistant Examiner*—Ronald D Hartman, Jr.
(74) *Attorney, Agent, or Firm*—Marshall, Gerstein & Borun LLP (57) ABSTRACT

An advanced control block that implements multiple-input/multiple-output control, such as model predictive control, within a process control system uses a compensation block or algorithm and a single control model based on a single process model to provide advanced control in a process having widely variable process delay. The compensation block changes the execution period of the advanced control block to account for changes in the one or more process variables responsible for the variable process delay, which eliminates the need to provide different advanced control models or control definitions for different operating regions for a process in the cases in which the delay in a process output is correlated to a measurable process or control variable.

39 Claims, 5 Drawing Sheets

U.S. PATENT DOCUMENTS

| | | | |
|---|---|---|---|
| 5,587,899 A | 12/1996 | Ho et al. | 364/157 |
| 5,594,858 A | 1/1997 | Blevins | 395/326 |
| 5,659,467 A | 8/1997 | Vickers | 364/138 |
| 5,659,667 A | 8/1997 | Buescher et al. | 395/23 |
| 5,680,409 A | 10/1997 | Qin et al. | 371/48 |
| 5,682,309 A | 10/1997 | Bartusiak et al. | 364/149 |
| 5,682,317 A | 10/1997 | Keeler et al. | 364/431.03 |
| 5,704,011 A | 12/1997 | Hansen et al. | 395/22 |
| 5,740,033 A | 4/1998 | Wassick et al. | 364/149 |
| 5,748,467 A | 5/1998 | Qin et al. | 364/148 |
| 5,781,432 A | 7/1998 | Keeler et al. | 364/164 |
| 5,825,646 A | 10/1998 | Keeler et al. | 364/164 |
| 5,838,563 A | 11/1998 | Dove et al. | 364/188 |
| 5,841,652 A | 11/1998 | Sanchez | 364/164 |
| 5,859,773 A | 1/1999 | Keeler et al. | 364/164 |
| 5,873,251 A | 2/1999 | Iino | 60/660 |
| 5,920,478 A | 7/1999 | Ekblad et al. | 364/149 |
| 5,970,430 A * | 10/1999 | Burns et al. | 702/122 |
| 6,215,907 B1 | 4/2001 | Kumar et al. | 382/240 |
| 6,253,113 B1 * | 6/2001 | Lu | 700/28 |
| 6,269,274 B1 | 7/2001 | Steinman et al. | 700/28 |
| 6,298,454 B1 | 10/2001 | Schleiss et al. | 714/37 |
| 6,360,131 B1 * | 3/2002 | Cheng | 700/40 |
| 6,438,430 B1 * | 8/2002 | Martin et al. | 700/28 |
| 6,453,308 B1 * | 9/2002 | Zhao et al. | 706/21 |
| 6,493,596 B1 * | 12/2002 | Martin et al. | 700/37 |
| 6,594,530 B1 * | 7/2003 | Glanzer et al. | 700/18 |
| 6,625,501 B2 * | 9/2003 | Martin et al. | 700/44 |
| 6,735,483 B2 * | 5/2004 | Martin et al. | 700/29 |

OTHER PUBLICATIONS

Edgar et al., "Optimization of Chemical Processes," Chapter 7, *McGraw–Hill, Inc.*, pp. 251–298 (1988).

Froisy, "Model Predictive Control: Past, Present and Future," *33 ISA Transactions* pp. 235–243 (1994).

Hoffman et al., "Model Predictive Control: Future Requirements and Trends," ISA, 1993, Paper #93–369, pp. 1241–1247 (Oct. 1993).

McMillian, "Process Control Optimization," slides entitled "Breaking Into Model Based Control" presented at *Fisher–Rosemount Systems Advanced Control Seminar*, San Antonio (Nov. 1997).

Honeywell Hi–Spec Solutions: "Honeywell's RMPCT—A Breakthrough in Process Control Technology" Frequently Asked Questions.

Qin et al., "An Overview of Industrial Model Predictive Control Technology," AIChE Conference, pp. 1–31 (1996).

Wilhelm et al., "Advanced Process Control In Record Time," Control Magazine Software and Information Systems (May 1999).

Provisional U.S. Appl. No. 60/132,780, dated May 6, 1999, Integrating Distributed Process Control System Functionality on a Single Computer.

U.S. Appl. No. 09/412,078, dated Oct. 4, 1999, "Integrated Advanced Control Blocks in Process Control Systems.".

Search Report under Section 17 issued in GB 0302813.1 application by the United Kingdom Patent Office on Jul. 8, 2003.

* cited by examiner

ADAPTATION OF ADVANCED PROCESS CONTROL BLOCKS IN RESPONSE TO VARIABLE PROCESS DELAY

FIELD OF THE INVENTION

The present invention relates generally to process control systems and, more particularly, to the use of advanced control blocks, such as model predictive control blocks, in the presence of significantly variable process delay.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Some process control systems, such as the DeltaV® system sold by Fisher Rosemount Systems, Inc., headquartered in Austin, Tex., use function blocks or groups of function blocks referred to as modules located in the controller or in different field devices to perform control operations. In these cases, the controller or other device is capable of including and executing one or more function blocks or modules, each of which receives inputs from and/or provides outputs to other function blocks (either within the same device or within different devices), and performs some process operation, such as measuring or detecting a process parameter, controlling a device or performing a control operation, like implementing a proportional-derivative-integral (PID) control routine. The different function blocks and modules within a process control system are generally configured to communicate with each other (e.g., over a bus) to form one or more process control loops.

Process controllers are typically programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and an output block, such as an analog output (AO) function block. These control loops typically perform single-input/single-output control because the control block creates a single output used to control a single process input, such as a valve position, etc.

However, in certain cases, the use of a number of independently operating, single-input/single-output control loops is not very effective because the process variables being controlled are effected by more than a single process input and, in fact, each process input may effect the state of many process outputs. An example of this might occur in, for example, a process having a tank being filled by two input lines, and being emptied by a single output line, each line being controlled by a different valve, and in which the temperature, pressure and throughput of the tank are being controlled to be at or near desired values. As indicated above, the control of the throughput, the temperature and the pressure of the tank may be performed using a separate throughput control loop, a separate temperature control loop and a separate pressure control loop. However, in this situation, the operation of the temperature control loop in changing the setting of one of the input valves to control the temperature within the tank may cause the pressure within the tank to increase, which, for example, causes the pressure loop to open the outlet valve to decrease the pressure. This action may then cause the throughput control loop to close one of the input valves, thereby effecting the temperature and causing the temperature control loop to take some other action. As will be understood in this example, the single-input/single-output control loops cause the process outputs (in this case, throughput, temperature and pressure) to oscillate without ever reaching a steady state condition, which is undesirable.

Model predictive control (MPC) or other types of advanced control have been used in the past to perform control in these types of situations. Generally speaking, model predictive control is a multiple-input/multiple-output control strategy in which the effects of changing each of a number of process inputs on each of a number of process outputs is measured and these measured responses are then used to create a model of the process. The model of the process is inverted mathematically and is then used as a multiple-input/multiple-output controller to control the process outputs based on changes made to the process inputs. In some cases, the process model includes a process output response curve for each of the process inputs and these curves may be created based on a series of, for example, pseudo-random step changes delivered to each of the process inputs. These response curves can be used to model the process in known manners. Model predictive control is known in the art and, as a result, the specifics thereof will not be described herein. However, model predictive control is described generally in Qin, S. Joe and Thomas A. Badgwell, "An Overview of Industrial Model Predictive Control Technology," AIChE Conference, 1996.

Currently, some process control systems use model predictive control (MPC) to provide control for multi-variable processes and, in at least one instance, the process control system supports automated testing of the process to determine the process model used to develop the specific MPC control routine, referred to herein as an MPC module. This approach is described in co-pending application Ser. No. 09/412,078 entitled "Integrated Advanced Control Blocks in Process Control Systems" which was filed on Oct. 4, 1999 and which is hereby expressly incorporated by reference herein. In this case, tools that are commonly available are used to automatically identify a dynamic process model for the process using historic data of the process outputs and inputs. The control system then automatically generates a control model to be used by the model predictive control module based on the determined process model. In particular, after the process model is determined, the control model or control logic for an MPC module may be generated utilizing a number of step or impulse response models which capture the dynamic relationships between process inputs and process outputs based on the determined process model. Each step or impulse response model represents a particular process output response over time to an input step or impulse with all other inputs remaining constant. Typically, each of the response models is represented as a series of coefficients at discrete points in time over the time required for the process to fully respond, commonly referred to as the time to steady state, Tss. The number of coefficients is normally selected to be the same value for all step or impulse response curves that describe the input/output interactions of a particular process. For example, each individual step or impulse response curve may include 120 coefficients that represent the response at evenly spaced times over the time to steady state.

Because the generation of the model predictive control definition or logic is based on the step or impulse response curves, the control model or control definition generated from the response curves is traditionally executed at the sample rate represented by the time spacing of the coefficients in the response curves or process model. For example, if the process model is made up of 120 coefficients and the time to steady state is 120 minutes, then the control definition or control logic generated from this model would be executed once per minute, i.e., the time represented by the spacing between the individual coefficients of the response curves.

In many implementations of MPC, it is assumed that the process may be characterized as linear and time invariant. If these assumptions are correct, then the model predictive control routine generated from a process model identified during normal plant operating will perform well. However, if the process dynamics change from those captured by the process model, these changes may degrade the control because the control is based on the process model prior to the change. For example, in some cases, the process feed rate may change the process delay time required for a process output to reflect a change in a process input. Such variations in the process response can often be traced to the effect of process feed rate on the transport delay through the process. One example of this is the time required for pulp stock to move through a tower in a bleaching process, which is strictly a function of the feed rate assuming plug flow through the tower. In this case, the time required for the brightness sensor located downstream of the tower to indicate changes as a result of chemical addition prior to the tower will vary with the stock flow rate.

Currently, in cases in which the process model changes significantly due to variable process delay or other conditions, MPC applications utilize multiple process models and, thus, multiple control models or definitions, one for each of the expected regions of process operation. Here, the MPC control routine switches between different process models and, thus, different control models, based on process operating conditions. While effective, this approach requires multiple control routines to be developed and to be stored in the controller which, as will be seen, it is not necessary in all cases.

While these problems exist for model predictive controllers, the same or similar problems exist in the development and use of other advanced multiple-input/multiple-output control blocks or systems, such as neural network modeling or control systems, multi-variable fuzzy logic controllers, real time optimizers, etc.

SUMMARY OF THE INVENTION

An advanced control application uses a compensation block or algorithm and a single control model based on a single process model to provide advanced control, such as MPC control, in a process having widely variable process delay. The compensation block changes the execution period of the advanced control module to account for changes in the one or more process variables responsible for the variable process delay. This advanced control system eliminates the need to provide different advanced control models or control definitions for different operating regions of a process in cases in which the delay in a process output reflects a measurable process or control variable, such as process feed rate or throughput.

In one embodiment, an advanced control element implements multiple-input/multiple-output control, such as model predictive control, neural network control, etc., within a process control system. The advanced control element, which can be stored on a computer readable medium and executed on a processor within, for example, a controller, may include a control block that has a first plurality of inputs, each input being adapted to receive a different one of a set of process parameters, a second plurality of outputs, each output being adapted to be communicatively coupled to a different process input for controlling the set of process parameters and control logic responsive to the first plurality of inputs to produce a control signal at each of the second plurality of outputs. The advanced control element may also include an execution rate block that is adapted to receive values of a parameter that, preferably, effects process delay, and that computes an execution rate for the control logic based on the parameter. The execution rate block may include a filter adapted to filter the parameter, a computation block that determines the execution rate for the control logic as a linear or a non-linear function of the parameter and a limiter adapted to limit the execution rate determined by the computation block.

DESCRIPTION

Figure 1:
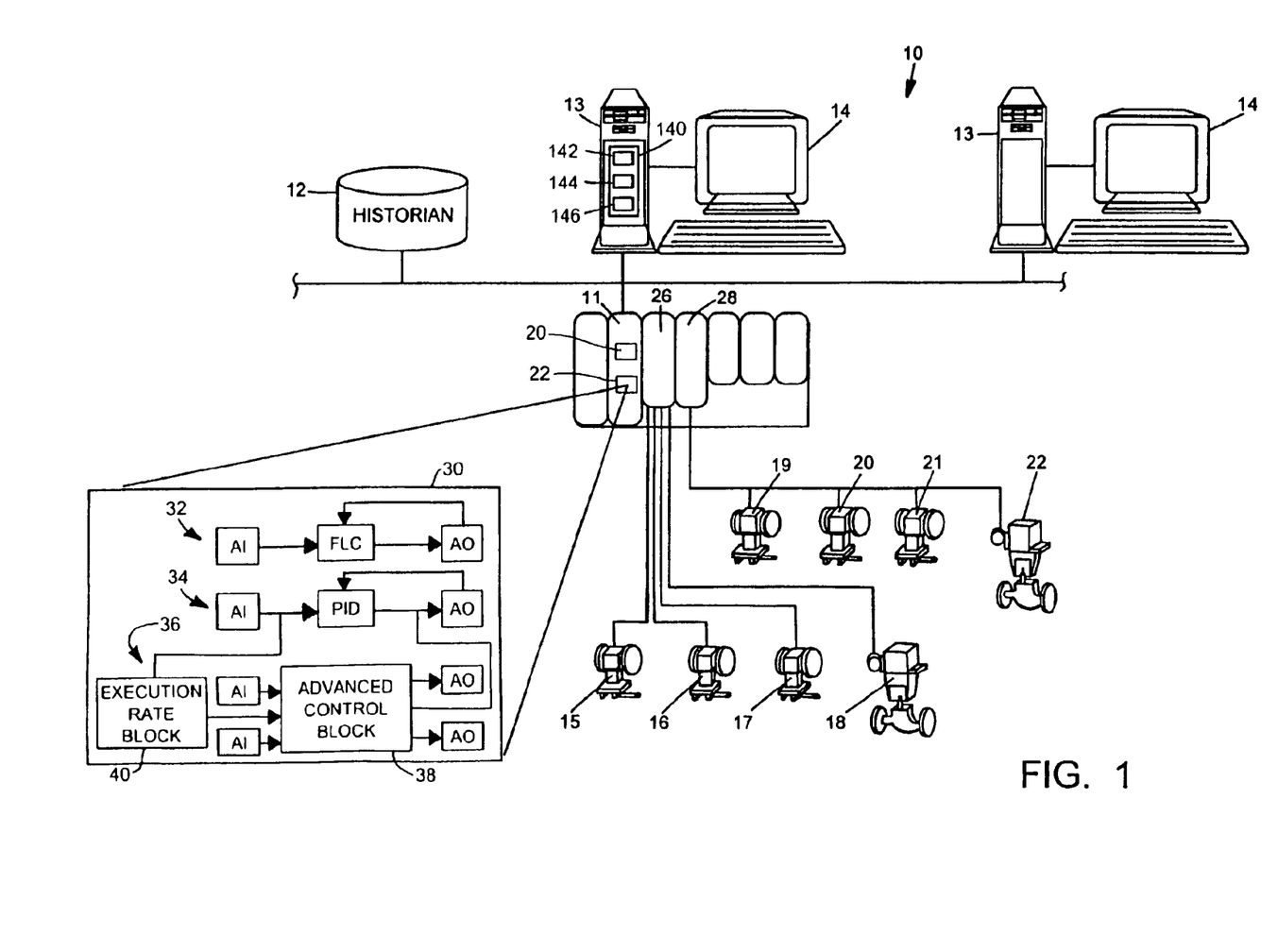
FIG. 1 is a block/schematic diagram of a process control system including an advanced control block adapted to compensate for variable process delay.

Referring now to FIG. 1, a process control system 10 includes a process controller 11 connected to a data historian 12 and to one or more host workstations or computers 13 (which may be any type of personal computers, workstations, etc.), each having a display screen 14. The controller 11 is also connected to field devices 15–22 via input/output (I/O) cards 26 and 28. The data historian 12 may be any desired type of data collection unit having any desired type of memory and any desired or known software, hardware or firmware for storing data. The data historian 12 may be separate from (as illustrated in FIG. 1) or a part of one of the workstations 13. The controller 11, which may be, by way of example, the DeltaV controller sold by Fisher-Rosemount Systems, Inc., is communicatively connected to the host computers 13 and to the data historian 12 via, for example, an ethernet connection or any other desired communication network. The controller 11 is also communicatively connected to the field devices 15–22 using any desired hardware and software associated with, for example, standard 4-20 ma devices and/or any smart communication protocol such as the FOUNDATION Fieldbus protocol, the HART protocol, etc.

The field devices 15–22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15–18 are standard 4-20 ma devices that communicate over analog lines to the I/O card 26 while the field devices 19–22 are smart devices, such as Fieldbus field devices, that communicate over a digital bus to the I/O card 28 using Fieldbus protocol communications. Of course, the field devices 15–22 could conform to any other desired standard(s) or protocols, including any standards or protocols developed in the future.

The controller 11 includes a processor 20 that implements or oversees one or more process control routines (stored in a memory 22), which may include control loops, stored therein or otherwise associated therewith and communicates with the devices 15–22, the host computers 13 and the data historian 12 to control a process in any desired manner. It should be noted that any control routines or elements described herein may have parts thereof implemented or executed by different controllers or other devices if so desired. Likewise, the control routines or elements described herein to be implemented within the process control system 10 may take any form, including software, firmware, hardware, etc. For the purpose of this disclosure, a process control element can be any part or portion of a process control system including, for example, a routine, a block or a module, stored on any computer readable medium. Control routines, which may be modules or any part of a control procedure such as a subroutine, parts of a subroutine (such as lines of code), etc., may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 11 may be configured to implement a control strategy or control routine in any desired manner.

In one embodiment, the controller 11 implements a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which can be the case with Fieldbus devices. While the description of the control system is provided herein using a function block control strategy, the control strategy (control loops or modules) could also be implemented or designed using other conventions, such as ladder logic, sequential function charts, etc. or using any other desired programming language or paradigm.

As illustrated by the exploded block 30 of FIG. 1, the controller 11 may include a number of single-loop control routines, illustrated as routines 32 and 34, and, if desired, may implement one or more advanced control loops, illustrated as control loop 36. Each such loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to numerous AI function blocks and outputs communicatively connected to numerous AO function blocks, although the inputs and outputs of the advanced control block 38 may be connected to any other desired function blocks or control elements to receive other types of inputs and to provide other types of control outputs. The advanced control block 38 may be any type of multiple-input/multiple-output control block used to control two or more process outputs by providing control signals to one or more process inputs. While the advanced control block 38 is described herein as being a model predictive control (MPC) block, the advanced control block 38 could be any other multiple-input/multiple-output block, such as a neural network modeling or control block, a multi-variable fuzzy logic control block, a real-time-optimizer block, etc. It will be understood that the function blocks illustrated in FIG. 1, including the advanced control block 38, can be executed by the controller 11 or, alternatively, can be located in and executed by any other processing device, such as one of the workstations 13 or even one of the field devices 19–22.

Of course, the use an MPC or other advanced control block within a controller is known and, generally, the primary objective of many traditional MPC installations within the process industry is to maximize throughput of a large unit, e.g., a distillation column. Using the ability of an MPC system to maintain a process at its operating constraint, it is often possible to achieve a 1–3 percent increase in throughput in such an installation. However, for these operating conditions, the throughput of the process may be expected to vary over a very small range and, as a result, the impact of throughput on the process response is often negligible. For this reason, the control model or control definition generated using a process model identified at normal throughput provides good control where the feed rate and thus process delay varies over a narrow range.

However, in many non-traditional installations, such as in brightness control in the pulp and paper industry, paper machine MD control, H/N ratio control in the ammonia industry and others, large changes in some process variable, such as throughput, causes large changes in the process dead time or process delay. In the past, to the extent these types of processes implemented MPC, they had to do so using control switching which, essentially, uses different process models defined for different operating regions of the process. Here, the operating regions are primarily defined by the throughput of the process. Using this technique, a process model is identified at each of a number of operating conditions and a different MPC control model is generated for each of these different process models. As the process conditions change, for example, as throughput changes, the MPC controller switches control definitions or models to match the current process condition. Thus, using this technique, numerous different MPC control models are defined and stored for numerous different process feed rates or throughputs. This type of control switching is a very general approach that allows any non-linearity that is a function of a measured process variable to be addressed. However, to apply this technique, multiple process models must be identified to allow the control models at different operating conditions to be generated. The introduction of multiple process models and control definitions increases the complexity of commissioning and maintaining an MPC control system.

However, it has been discovered that, when process delay varies primarily as a function of some particular set of process (or control) parameters, such as throughput, then it is possible to avoid the complexity of control switching in advanced control blocks. In fact, in this case, it has been determined that the same process model can be used to provide MPC (or other advanced control) at all or most process operating conditions, even when the process delay varies greatly. In particular, it is possible to use a single process model to define an advanced control routine or control model and, by varying the execution rate of the control routine as a function of the process or control parameter(s) that effect the process delay, perform effective MPC or other advanced control throughout the range of process operation. One manner of implementing this execution rate compensation in the system of FIG. 1 is to provide a separate execution rate modifier block 40 which provides a signal that controls the execution rate of the MPC block 38. As illustrated in FIG. 1, the execution rate modifier block 40 receives a signal indicative of the value of a process or control parameter (here a process parameter) that significantly effects the process delay. In this case, the AI block providing a signal to the execution rate modifier block 40 may provide a signal indicative of the process throughput or feed rate. In any event, based on the value of the process parameter, the execution rate modifier block 40 determines an execution rate signal and provides such signal to the MPC block 38. The MPC block 38 then executes at the rate specified by the execution rate signal to perform process control.

Figure 2A:
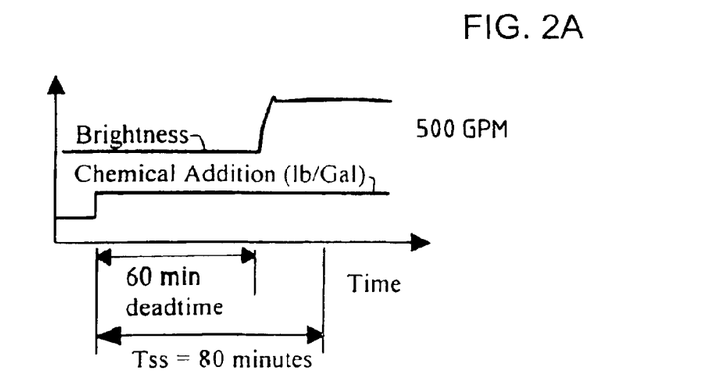
FIGS. 2A and 2B are graphs illustrating different process delay for a process at different throughputs.
Figure 2B:
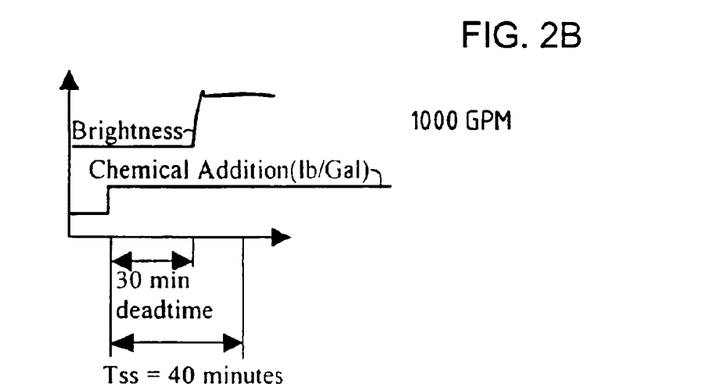

As an example of this concept, FIGS. 2A and 2B illustrate the step responses for a process having a process delay that is primarily a linear function of the feed rate or throughput at two different throughputs, namely, at a 500 gallons per minute (GPM) throughput and at a 1000 GPM throughput. It will be noted here that the time to steady state (Tss) is, in this case, twice the value for the 500 GPM rate (FIG. 2A) as for the 1000 GPM rate (FIG. 2B). Further, the response of the process is basically the same for the 1000 GPM case as for the 500 GPM case except that the time scale is altered or reduced in the 1000 GPM situation. That is, the process reaches steady state at the 1000 GPM throughput in half the time as it does at the 500 GPM throughput.

In fact, upon comparing the two step responses of FIGS. 2A and 2B, it can be seen that the only difference is that the response is spread over a different time to steady state, i.e., that the coefficients of the step response (assuming that there are equal number of coefficients in each case) are the same but the time difference between the coefficients is inversely proportional to the feed rate. As a result, the control model generated for process models determined at different process throughputs (having the same number of coefficients) would be basically the same except that the control execution rate would be different (because the model time to steady state is spread out over a longer period of time). Thus, in the case in which the process delay is an ascertainable function (linear or non-linear) of a process variable, such as feed rate, throughput, etc., then it is possible to adjust the control execution rate of an MPC control routine to compensate for the variation in process dead time.

The compensation in the execution period of the MPC control block or routine can be mathematically determined for the case in which the process dead time is a linear function of the throughput of the process according to the equation:

$$\text{Execution Period} = (\text{block execution period}) * (\text{execution modifier})$$
$$= (Tss/Nc) * (Fn/Fa)$$

Where:
Tss=Time to Steady State of the model used to generate the advanced control routine;
Nc=Number of coefficients used in the model;
Fn=Throughput of process when data was collected to generate the process model; and
Fa=Current throughput of the process.

Of course the execution rate is one over the execution period. Furthermore, in any practical implementation, the calculated execution period or rate should be limited and restricted to values that are supported by the control system. Also, the current measured throughput value may be heavily filtered to eliminate the affects of process noise.

In another embodiment, the MPC block execution rate may be calculated using the time to steady state that was used to create the process model and a fixed number of model coefficients (e.g., 120). Based on the calculated MPC execution rate and the module execution rate, the MPC block execution multiplier is then automatically set to give the correct block execution time according to the equation:

MPC Block Execution time=Module Execution Time*MPC Block Execution Multiplier

In this case, variation in process dead time may be corrected by adjusting the MPC Block Execution Multiplier as follows.

MPC Block Execution Multiplier=Integer(Mn*(Fn/Fa))

Where:
Mn=Original MPC Block Execution Multiplier;
Fn=Throughput of process when data was collected to generate the process model; and
Fa=Current throughput of the process.

The calculated execution multiplier should be restricted to values greater than or equal to 1 and the measured variable, e.g., throughput (Fa), should be filtered and limited to the expected range for normal operation.

Of course, this same concept can be applied for other than a linear relationship between process dead time and a measured process parameter as well as for other types of process parameters. In fact, generally speaking, the relationship DT=f(X,Y,Z . . . ) can be defined for a specific process where DT is process dead time and f(x) is a linear or non-linear function of process or control parameters X,Y,Z. Then, based on the calculated DT, the MPC function block scan period or execution rate can be adjusted according to the defined relationship. For example, the adjusted execution period may be determined as the original execution period times the ratio of the actual dead time divided by the original dead time.

If desired, the adjustment to the execution rate of the MPC block may be performed automatically based on the measurements of the one or more process/control variables which effect the process delay time or dead time. In one case, such as illustrated in FIG. 1, a composite block can be used to modify the execution rate of the MPC block as a function of a throughput input or other process/control variable. On the other hand, this capability may be integrated into the MPC block (or other advanced control block) if so desired. Of course, the projection of controlled and constraint parameters shown to the operator when developing the MPC block may be shown to the operator and the operator may select to use this feature or not use it as the operator so desires.

Still further, the determination of execution rate may be made using any process or control variable that is measured or obtained in any other way. For example, an operator may manually determine or obtain the values of the variable to be used and send such values down to the execution rate block as set point signals. In one case, the operator may periodically determine throughput or process rate based on other factors available to the operator and then send a signal indicative of that rate to the execution rate block. However, if desired, the operator or other user may instead manually determine or measure process dead time and send an indication of the determined dead time to the execution rate block. In this case, the execution rate block may use the value of process dead time directly as the input variable to change the execution rate of the control logic. It will be understood that dead time is generally directly related to the execution rate (i.e., as process dead time increases, the execution rate increases) while the process throughput is generally inversely related to the execution rate (i.e., as throughput increases, the execution rate decreases). Of course, other variables besides process dead time and throughput can be used and the values of these variables may be obtained in any manner, such as automatically, manually, by direct or empirical observations or measurements, etc.

Figure 3:
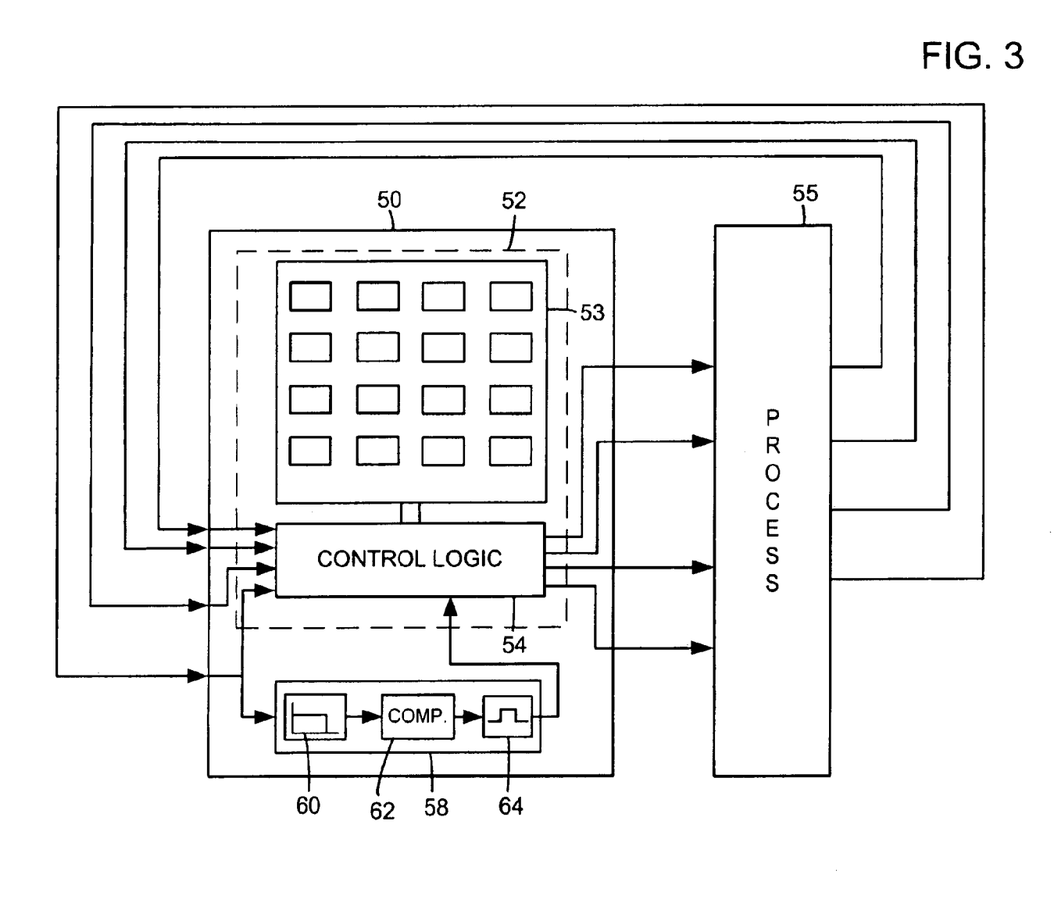
FIG. 3 is a block diagram illustrating an advanced control module having a matrix of impulse responses associated with a process model and an execution rate compensation block that alters the execution rate of the advanced control block based on a value of a process variable.

FIG. 3 illustrates an advanced control block 50 which, in this case, is an MPC control block, having a control model 52 having a matrix of input/output curves 53 and control logic 54 developed for a particular process model. The MPC control block 50 uses these curves and the developed logic to perform multiple-input/multiple-output control. As illustrated in FIG. 3, the MPC block 50 provides multiple control outputs (process inputs) to a process 55 to control the process 55. The MPC block 50 is also connected to the process 55 so as to receive multiple process parameters or variables (process outputs) which are used as inputs to the MPC block 50 and, in particular, the control logic 54. As will be understood, the MPC block 50 uses the control model 52 to provide control signals at the outputs thereof which are determined so as to drive the inputs of the MPC block (the process outputs or process variables) to desired values. However, one of the process variables, in this case throughput, is also provided to an execution rate block 58. The execution rate block 58 uses the value of the process variable, which is the variable that most prominently affects process delay or dead time, to determine an execution rate or period for the MPC logic block 54. The output of the compensation block 58 is provided to the MPC logic block 54 and determines the execution rate of the MPC logic block 54.

If desired, the execution rate block 58 may include a filter 60 that filters the incoming process variable (parameter) to reduce the changes in execution rate of the block 50 based on noise or temporary variations in the process variable. This filter may be, for example, a low pass filter and may be implemented using any desired analog or digital filtering techniques. The filtered process variable signal is then provided to a computation block 62 which, based on the techniques described above, calculates or determines a new execution rate for the block 50 based on the value of the filtered process variable. This new execution rate is then provided to a limiter which makes sure the execution rate is an integer value and is within range of possible execution rates supported by the device or system within which the block 50 is located. The limited execution rate is then provided to the control logic block 54 to determine the execution rate of that block.

Of course, the execution rate compensation block 58 may use the equations or relationships described above to determine the execution rate of the advanced control block 50. In particular, the compensation block 58 may store the execution rate at which the MPC block 50 was designed to operate based on the control model 52 which, in turn, is based on the value of the throughput of the process during which data was collected to create the process model used to create the control model 52. Then, when the throughput changes, the compensation block 58 uses the known relationship between the process variable (throughtput in this case) and the process delay to calculate a new execution rate for the MPC logic block 54. Of course, the relationship between the process variable and the process dead time can be linear or non-linear and the execution rate block 58 can use multiple process variables to determine the new execution rate if the process delay is a function of more than one variable or parameter. Still further, while, in this example, the process variable is throughput or feed rate, any other process or control variable that effects process delay can be used and be provided to the execution rate block 58. Thus, it will be noted that the new execution period or rate of the MPC block 50 can be a linear or non-linear function of one or more process or control variables and will depend on the relationship between the one or more process variables and the process delay. Still further, while the execution rate block 58 of FIG. 3 uses a process variable that is also provided to the control logic block 54 and is used in performing control signal calculations, this need not be the case. In fact, a separate signal or process variable not used by the rest of the control block 50 could be provided to the execution rate block 58.

Figure 4:
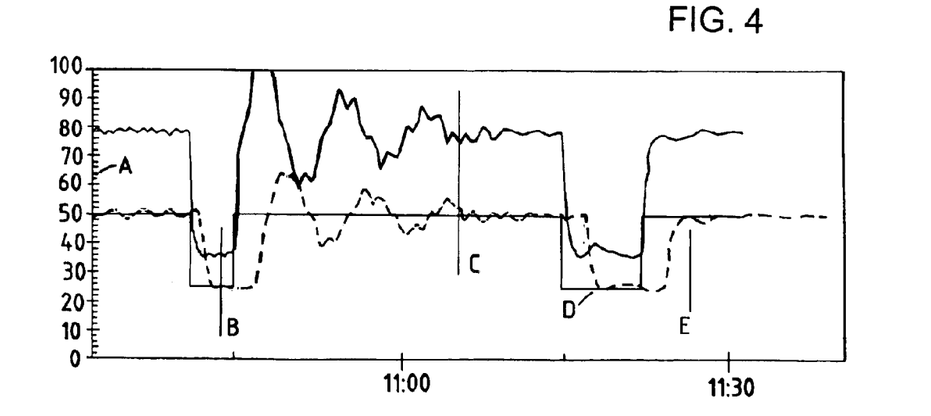
FIG. 4 is a graph illustrating the operation of an MPC block in the presence of widely variable process delay both with and without execution rate compensation.

FIG. 4 illustrates the effects of MPC control in which execution rate compensation is included and is not included for a process in which process delay varies greatly as a function of throughput. In this example, a process model was determined and was used to build a control model. The initial model parameters and identification results are shown in the Table 1 below.

TABLE 1

|  | Simulated process CV-MV | Identified model CV-MV | Simulated process CV-DV | Identified model CV-DV |
| --- | --- | --- | --- | --- |
| Dead Time | 60 sec. | 57 sec. | 7 sec. | 18 sec. |
| Gain | .6 | .598 | .25 | .17 |
| Lag(s) | 10 sec. | 7.5 sec. | 30 sec. | 12 sec. |

In this case, standard pseudo-random signals with the amplitude of 5% were applied on the manipulated variable (MV). Superposition of the sine signal, square wave signal and random signal of Table 2 were also applied on the disturbance variable (DV).

TABLE 2

|  | Period sec | Amplitude % | Random filter sec |
| --- | --- | --- | --- |
| Sine wave | 60 | 3 |  |
| Square wave | 150 | 2 |  |
| Random |  | 10 | 30 |

As will be noted, the constrained variable (CV) to manipulated variable (MV) relationship was identified very precisely, while the CV-DV relationship expresses a significant mismatch between the process and the model. This mismatch is due to insufficient excitation amplitude for identification purposes and was selected intentionally to reflect a real situation where disturbance dependent step responses are poorly excited and identified. The process model for this example was constructed with Tss=240 sec., 120 coefficients, and a 2 second scan or execution period. It was assumed that the process dead time changes in dependence with process state (e.g., throughput, ratio, etc.)

An initial test, beginning at point A of FIG. 4, was performed with the nominal MPC control parameters and at the process throughput used to create the process model. As can be seen in FIG. 4, the MPC block performed adequately for a set point change and disturbance compensation (FIG. 4—point A up to the point B). At point B (10:43), dead time in the simulated process was increased from 60 sec. to 120 sec. as a result of a simulated change in the process throughput. After point B, the set point was changed, which resulted in oscillatory control by the MPC block in response to set point changes, which is totally unacceptable in a real situation.

To correct the situation, the scan period of the MPC block was increased, at point C in FIG. 4, from 2 sec. to 4 sec. according to the concept described above. It will be noted that, after point C, the control loop returned to the performance quite close to the performance that it attained at the beginning of the test with the properly identified process model, even in view of set point changes and disturbance compensation after point C. In particular, the control system responded appropriately at points D and E in response to set point changes. As a result, it can be seen from FIG. 4 that the proper compensation in the execution rate of the MPC block compensates for a change in process dead time or delay resulting from a change in process state (in this case, throughput).

Of course, the MPC or other advanced control block can be created and downloaded to a controller or other device in any desired manner. As illustrated in FIG. 1, one of the workstations 13 may include an advanced control block generation routine 140 that is used to create, download and implement the advanced control block 38 (and execution rate block 40) of FIG. 1 or the block 50 of FIG. 3 in a manner described in more detail herein. While the advanced control block generation routine 140 may be stored in a memory within the workstation 13 and executed by a processor therein, this routine (or any part thereof) may additionally or alternatively be stored in and executed by any other device within the process control system 10, if so desired. Generally speaking, the advanced control block generation routine 140 includes a control block creation routine 142 that creates an advanced control block and that connects this advanced control block into the process control system, a process modeling routine 144 that creates a process model for the process or a portion thereof based on data collected by the advanced control block, and a control logic parameter creation routine 146 that creates control logic parameters for the advanced control block from the process model and that stores or downloads these control logic parameters in the advanced control block for use in controlling the process. It will be understood that the routines 142, 144 and 146 can be made up of a series of different routines, such as a first routine that creates an advanced control element having control inputs adapted to receive process outputs and having control outputs adapted to provide control signals to process inputs, a second routine that enables a user to communicatively connect the advanced control element within the process control routine (which may be any desired configuration routine), a third routine that uses the advanced control element to provide excitation waveforms to each of the process inputs, a fourth routine that uses the advanced control element to collect data reflecting the response of each of the process outputs to the excitation waveforms, a fifth routine that creates a process model from the collected data, a sixth routine that develops advanced control logic parameters from the process model and a seventh routine that places the advanced control logic and, if needed, the process model within the advanced control element to enable the advanced control element to control the process.

Figure 5:
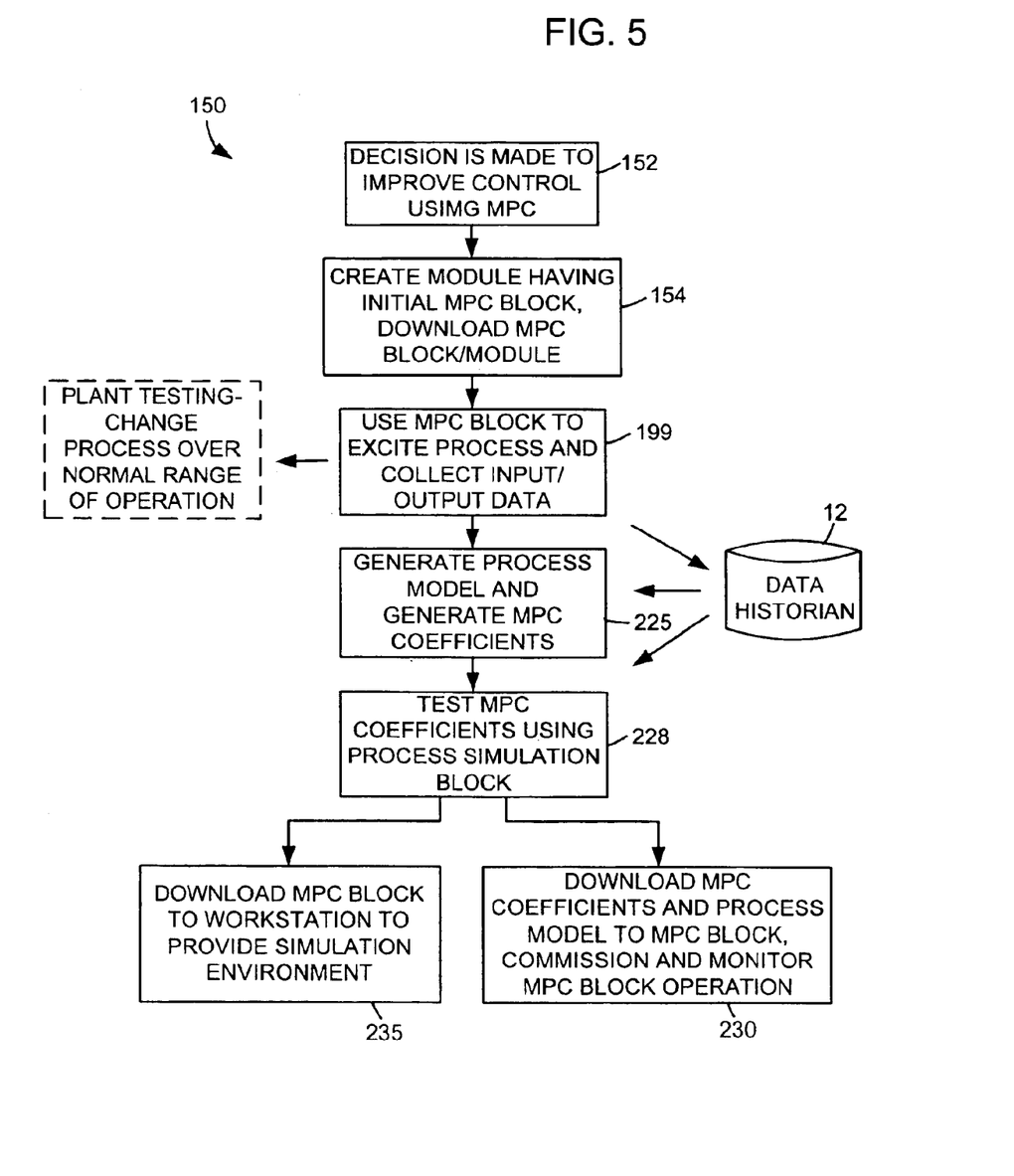
FIG. 5 is a flow diagram illustrating the operation and creation of an advanced control block which compensates for variable process delay within the process control system of FIG. 1.

Referring now to FIG. 5, a flowchart 150 illustrates the steps of creating and using an advanced control block and, in particular, an MPC control block having execution rate compensation, within a process control system such as the process control system 10 of FIG. 1. While the flowchart 150 of FIG. 5 illustrates the creation of an MPC block or module, the same or similar steps could be performed to create and use any other advanced control block such as any multiple-input/multiple-output control block like a neural network modeling or control block, a multi-variable fuzzy logic control block, etc.

First, at some time 152, a decision is made to improve or provide control within the process control system 10 by implementing an MPC procedure. This decision may be made at the time the process control system 10 is first set up or at some later time after, for example, other control routines, such as single-loop control routines, have been found to provide inadequate control. At the time 152, an operator or other user executes the MPC block generation routine 140 to begin the steps of creating an MPC module or control loop having execution rate compensation within the process control system. As part of this process, the operator chooses the process inputs to which the outputs of the MPC block being designed are to be connected and chooses the process outputs to which the inputs of the MPC block being designed are to be connected. While the MPC block may have any number of inputs and outputs, each MPC block generally has three kinds of inputs including controlled parameter inputs which are the process variables or parameters that are to be maintained at a set point (or within a set range), constrained inputs which are the process variables that are constrained to a particular limit or range based on, for example, physical limitations associated with the process and which the MPC block must not force to be outside of the constrained range or limit, and process disturbance parameter inputs, which are other process variables, such as process inputs that, when altered, are known to cause changes to the controlled parameters. The MPC block uses the process disturbance parameter inputs to foresee changes to the controlled parameters (i.e., the controlled process outputs) and to limit the effects of these changes before they occur. Other inputs may also be provided to the MPC block, such as feedback from a device or other process element being controlled which enables the MPC control block to provide more effective control of these elements. Similarly, the outputs of the MPC block may be connected to control any desired process variable or other process input including control loop inputs, device control inputs, etc. The routine developed by connecting the MPC block to other control elements is referred to herein as an MPC module. While the user may create an MPC function block, the user may also obtain an initial function block from a memory, such as a library of function blocks, and use this function block or create an instance of this function block for use in the process control system. Likewise, a user or other provider may provide a function block or other control element in any other desired manner.

At this time, the user may determine or specify a relationship between one or more process or control variables and process dead time. This relationship may be specified as an equation or as one of a number of known potential relationships, such as a linear function, one of a number of different possible non-linear functions, etc. Further, the user may instruct the system to determine a relationship between one or more process or control parameters and process dead time if so desired.

At a step 154, the operator creates an MPC module having an MPC block (which does not yet have all of the information needed to provide model predictive control) with the specified inputs and outputs communicatively connected within the process control system as well as an execution rate compensation block and downloads these blocks or modules to the appropriate controller or other device that will implement the MPC module. As part of this process, the operator configures the process control system 10 to implement the MPC block by communicatively coupling the outputs of the MPC block to the appropriate process inputs and by communicatively coupling the inputs of the MPC block to the appropriate process outputs.

Figure 6:
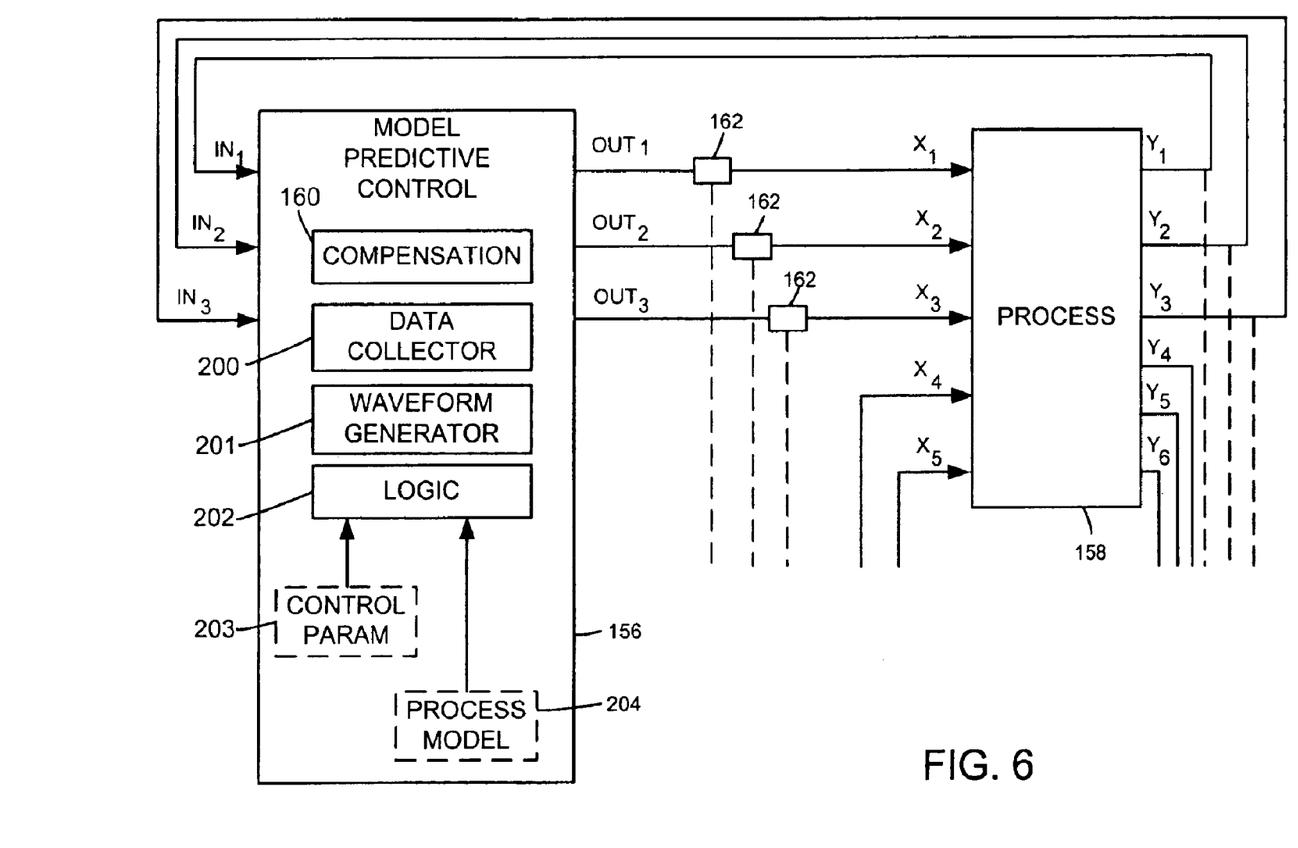
FIG. 6 is a block diagram of an MPC block having execution rate compensation connected to a process.

Referring to FIG. 6, an MPC block 156 is illustrated as being connected to a process 158. The MPC block 156 is a 3×3 control block having three inputs $IN_1$–$IN_3$ and three outputs $OUT_1$–$OUT_3$ while the process 158 includes inputs $X_1$–$X_5$ and outputs $Y_1$–$Y_6$. Of course, the MPC block 156 and the process 158 could include any other numbers of inputs and outputs. While the MPC block 156 may generally be a square block, i.e., having the same number of inputs as outputs, this configuration is not necessary and the MPC block 156 may have different numbers of inputs and outputs. As illustrated in FIG. 6, the operator communicatively connects the process outputs $Y_1$–$Y_3$ to the MPC block inputs $IN_1$–$IN_3$, respectively, and communicatively connects the MPC block outputs $OUT_1$–$OUT_3$ to the process inputs $X_1$–$X_3$, respectively. Of course, any of the inputs and outputs of the process 158 may be connected to other control loops or to other elements within other control routines associated with the process control system 10 (as indicated by dotted lines connected to the process inputs and outputs in FIG. 6). Here, the operator may also communicatively couple the one or more process variables that effect process delay to an execution rate compensation block 160. Generally speaking, the MPC block 156 and the other blocks which may be providing control inputs to the process 158 (as illustrated by dotted lines connected to the process inputs $X_1$–$X_3$) will be connected through a switch of some sort, these switches being illustrated by the boxes 162 in FIG. 6. The switches 162 may be hardware or software switches and, if desired may be provided by having the different control input signals delivered to different inputs of a function block, such as a Fieldbus function block, which can then select between the control signal from the MPC block 156 and a control signal from a different function block, such as from a PID function block, based on the mode of the function block receiving the two signals.

Of course, the operator can connect the MPC block 156 to the process 158 in any desired manner and, generally speaking, will use the same control configuration or design program that the operator uses to create other control loops like single-loop control routines within the process control system 10. For example, the operator may use any desired graphical programming routine to specify the connections between the MPC block 156 and the process inputs and outputs. In this manner, the MPC block 156 is supported in the same way as other control blocks, elements or routines, which makes configuration and connection of the MPC block 156 and support of that block within the control system 10 no different than the configuration, connection and support of the other blocks within the system. In one embodiment, the MPC block 156, as well as the other blocks within the control system 10, are function blocks designed to be the same as or similar to Fieldbus function blocks. In this embodiment, the MPC block 156 may have the same or similar types of inputs, outputs, etc. as specified or provided in the Fieldbus protocol and is capable of being implemented by, for example, the controller 11 using communication links which are the same as or similar to those specified by the Fieldbus protocol. A method of graphically creating process control routines and elements thereof is described in Dove et al., U.S. Pat. No. 5,838,563 entitled "System for Configuring a Process Control Environment" which is hereby expressly incorporated by reference herein. Of course, other control loop or control module design strategies could be used as well, including those which use other types of function blocks or which use other routines, sub-routines or control elements within a process control configuration paradigm.

When using a control system based on the interconnection of function blocks, such as those provided by the Fieldbus function block paradigm, the MPC block 156 can be connected directly to other function blocks within the process control routine. For example, the MPC block 156 may be connected to control devices, such as valves, etc. directly by connecting a control output of the MPC block 156 to an output block (such as an AO block) associated with the device being controlled. Likewise, the MPC block 156 may provide control signals to function blocks within other control loops, such as to the input of other control function blocks, to oversee or override the operation of these control loops.

Thus, as will be understood, the process inputs $X_1$–$X_3$ to which the outputs of the MPC control block 156 are connected in FIG. 6 may be any desired process inputs including inputs to control loops defined within an existing control strategy or inputs to valves or other devices connected to the process. Likewise, the process outputs $Y_1$–$Y_3$ connected to the inputs of the MPC block 156 may be any desired process outputs including outputs of valves or other sensors, outputs of AO or AI function blocks or outputs of other control elements or routines.

Referring again to the step 154 of FIG. 5, once the operator has created a control module including an initial MPC block having the inputs and outputs connected to desired process outputs and inputs, respectively, and having an execution rate compensation block, the control module having the initial MPC block therein is downloaded into the appropriate device, such as the controller 11 or one of the workstations 13, for execution. Next, at a step 199, the operator instructs the initial MPC block to begin to excite the process in known manners and to collect process input and output data while the process is being excited.

As illustrated in FIG. 6, the initial MPC block 156 includes a data collection routine 200, a waveform generator 201, generic control logic 202 and storage for storing control parameters 203 and a process model 204. The generic logic 202 may be, for example, a generic MPC routine that needs coefficients or other control parameters to be able to operate to perform control in a particular instance. In some cases, the generic logic 202 may also need a process model for the process being controlled to control that process. After being downloaded into, for example, the controller 11, the initial MPC block 156 is instructed, via the MPC creation routine 142, to begin the next phase of development of the MPC block 156 in which data is collected for each of the process outputs for use in creating a process model. In particular, when instructed to do so by the operator (or at any other desired time), the waveform generator 201 of the MPC block 156 begins to produce a series waveforms at the outputs $OUT_1$–$OUT_3$ thereof so as to provide excitation waveforms to each of the process inputs $X_1$–$X_3$. If desired, these waveforms may be provided to the generator 201 by software within the user workstation 13 but, are preferably created by the generator 201. The waveforms generated by the waveform generator 201 are preferably designed to cause the process to operate over the different ranges of inputs expected during normal operation of the process, which may include vastly different throughputs. To develop a process model for an MPC control routine, the waveform generator 201 may deliver to each of the process inputs $X_1$–$X_3$, a series of different sets of pulses, wherein the pulses within each of the sets of pulses have the same amplitude but have pseudo-random lengths and wherein the pulses within the different sets of pulses have different amplitudes. Such a series of set of pulses may be created for and then delivered to each of the different process inputs $X_1$–$X_3$ sequentially, one at a time. During this time, the data collection unit 200 within the MPC block 156 collects or otherwise coordinates the collection data indicating the response of the process outputs $Y_1$–$Y_3$ to each of the waveforms generated by the waveform generator 201 and may collect or coordinate the collection of data pertaining to the excitation waveform being generated. This data may be stored in the MPC block 156 but, preferably, is automatically sent to the data historian 12 for storage and/or to the workstation 13 where this data may be displayed on the display screen 14.

Thus, instead of trying to control the process 158 using some advanced control logic (which has not yet been completely developed), the MPC block 156 first provides a set of excitation waveforms to the process 158 and measures the response of the process 158 to these excitation waveforms. Of course, the excitation waveforms generated by the waveform generator 201 may be any desired waveforms developed to create a process model useful for the creation of control logic parameters for any advanced control routine. In this example, the waveform generator 201 generates any set of waveforms that is known to be useful in developing a process model for a model predictive controller, and these waveforms may take any form now known or developed in the future for this purpose. Because waveforms used to excite a process for the purpose of collecting data to develop a process model for model predictive control are well known, these waveforms will not be described further herein. Likewise, any other or any desired types of waveforms may be developed by the waveform generator 201 for use in developing process models for other advanced control (which includes modeling) routines, such as neural networks, multi-variable fuzzy logic, etc. control routines.

It should be noted that the waveform generator 201 may take any desired form and may, for example, be implemented in hardware, software or a combination of both. If implemented in software, the waveform generator 201 may store an algorithm that can be used to generate the desired waveforms, may store digital representations of the waveforms to be generated, or may use any other routine or stored data to create such waveforms. If implemented in hardware, the waveform generator 201 may take the form of, for example, an oscillator or a square wave generator. If desired, the operator may be asked to input certain parameters needed to design the waveforms, such as the approximate response time of the process, the step size of the amplitude of the waveforms to be delivered to the process inputs, etc. The operator may be prompted for this information when the MPC block 156 is first created or when the operator instructs the MPC block 156 to begin to upset or excite the process and collect process data. In a preferred embodiment, the data collection unit 200 collects (or otherwise assures the collection of) data in response to each of the excitation waveforms for three or five times the response time input by the operator to assure that a complete and accurate process model may be developed. However, data may be collected for any other amount of time.

In any event, the MPC control block 156 preferably operates until the waveform generator 201 has completed delivering all of the necessary excitation waveforms to each of the process inputs $X_1$–$X_3$ and the data collection unit 200 has collected data for the process outputs $Y_1$–$Y_3$. Of course, the operation of the MPC block 156 may be interrupted if so desired or if necessary during this data collection process.

Next, as indicated in FIG. 5 at the step 225, the operator may, at some point decide to implement the next phase of developing the MPC block by executing the process modeling routine 144 which accesses the collected data from the data historian 12 and runs any known process model generation routine to create a process model from the collected data.

If desired, the process modeling routine 144 may run a data screening procedure on the collected data. This data screening procedure may check the collected data for outliers and other obviously erroneous data and may check other values associated with the collected data, such as status and limit values associated with the collected data, to determine if the data was generated by a function block having a bad or improper status, if the data was at a limit, if the data was generated when a function block or other element was in an improper mode, or if the data was, in some other way, generated under abnormal or undesirable process conditions. For example, in the Fieldbus communication protocol, data generated by function blocks also includes a status, a limit and a mode indication which can be stored with the data in the data historian 12 and used to screen the data. If desired, the data screening routine may illustrate the collected data to the operator and enable the operator to mark the data to be screened or eliminated, by for example, highlighting or otherwise identifying this data, based on the operator's knowledge of the process conditions. In this manner, data that was collected by the MPC block 156 when the process 158 was off-line, when the process 158 was not being controlled properly, when the process 158 was under repair, when a sensor or other device within the process 158 was faulty or being replaced, etc. may be selected and eliminated from the data to be used to create a process model.

After screening the data, the process modeling routine 144 creates a process model from the selected data. As noted above, the process modeling routine 144 may perform any desired or known type of process modeling analysis to develop a process model from the collected and screened data and the developed process model may take on any form, such as a mathematical algorithm, a series of response curves, etc.

If the process modeling routine 144 has a problem determining the process model, then an indication of the problem may be reflected in a status area of a user display. One problem that may be indicated is that there are not enough samples to identify or create a process model. A message such as "For the defined configuration, a minimum number of XXX samples is required. Data file contains only XXX samples" may be generated to notify the operator of this problem. Another problem that may be detected is that not enough excitation occurred on the process inputs. A message to this effect and identifying the signal tag names, such as TagX, TagY, etc. and the minimum changes to the excitation amount can be provided to the operator is such a problem occurs.

If desired, and based on the conditions that prevented a successful model being identified, the user may change the time frame over which the process modeling is performed, or change process inputs so that the data used in process modeling routine 44 is valid. The process model that is identified may be automatically saved in any desired database to be accessible for later use. More experienced users may want to examine or edit the process model that was identified. Still further, the user may run a routine to determine if the process delay time significantly changes over its operating conditions and, if so, what process or control variables are correlated to that change. The routine may also provide a relationship between these variables and the process delay and this relationship may be provided to the execution rate block 160 within the MPC block 156 of FIG. 6.

At some point in the process, the logic parameter creation routine 146 may be executed to create the parameters (to be stored in the variables within the MPC block 156) needed by the generic logic 202 of the initial MPC block 156 to perform model predictive control. These control parameters, which may be, for example, matrix or other MPC coefficients for MPC logic, tuning parameters, neural network parameters (for a neural network), scaling factors (for multi-variable fuzzy logic) or any other desired parameters, are usually determined based on the generated process model. The logic parameter creation routine 146 may perform any desired or known procedure for creating the parameters from a process model. Generally speaking, this process entails inverting the process model in a matrix format. However, any other desired logic parameter creation routine could be used. Because the specifics of creating a process model from collected data for a process and generating MPC or other control logic parameters from that process model is known in the art, these procedures will not described further herein. It should be noted, however, that the operator may have some input on the creation of the control logic parameters for the MPC block 156. In fact, the operator may be requested or otherwise be given the ability to specify the values of certain variables typically used to create an MPC controller. For example, the operator may specify the set points and limits of each of the constrained inputs to the MPC block, the time frame over which control changes are to be made, i.e., the set point trajectory filter and the time constants associated with this filter, the maximum or minimum movement (rate limit) of an MPC output or a process output, whether any of the controlled parameters respond in an integrated manner, MPC optimization factors, variables or tuning parameters, the horizon of the MPC control block, i.e., how many steps forward calculations are to be performed to control to a desired state, the engineering unit ranges for each of the inputs and outputs of the MPC block 156, which of the manipulated variable targets will be allowed to be relaxed or not realized when one of the constraints is violated, a description and/or name of each of the MPC block inputs and outputs, the value of any optimization variables that can be set, the value of variables related to the aggressiveness or robustness of the MPC block, etc. If desired, the control logic generation routine 146 may store default values for some or all of these variables or settings and use these default values to create the MPC logic. However, the operator or other user may be able to change these settings via the user display 14. Still further, the operator may select an initial scan or execution rate based on the coefficients determined for the process model and select whether the control block is to use execution rate compensation based on a relationship between one or more process or control variables and process delay determined by the user or automatically by the system.

In any event, the MPC logic parameter creation routine 146 executes using this information and any other information that may be needed to create MPC (or other) control logic parameters, such as MPC coefficients.

After the MPC control logic parameters and execution rate compensation factors are created, at a step 228 of FIG. 5, the MPC control logic parameters or coefficients may be tested using a process simulation block. This simulation block may generally be developed from the process model created for the process and can be connected to an MPC block in a testing environment to test whether the created MPC control logic operates satisfactory over the range of normal operation of the process and if the execution rate block operates adequately over the range of expected process delay times. If the MPC logic is not satisfactory, any or all of the steps 154, 199 and 225 may be repeated to develop different MPC control logic or execution rate logic. However, if the MPC control logic is satisfactory, the MPC control logic parameters and the process model may be downloaded at a step 230 to the MPC block 156 to be stored in the parameter storage 203, the process model storage 204 and the compensation block 160 to be used to control the process 158. In this manner, the parameters needed by the MPC control logic are provided to and contained within the MPC block 156 and the MPC block 156 can be commissioned to operate or to actually perform control within the process according to the MPC control logic 202. Of course, if desired, the actual MPC logic 202 along with the parameters needed therefor can be created in the workstation 13 and downloaded to the MPC block 16.

Once downloaded and executed by the controller 11, the MPC module or loop having the MPC block 156 therein may perform reporting functions in the same manner as other blocks or elements within the control routine because, as noted above, the MPC block 156 and the control module including this block are designed using the same programming paradigm as the other control blocks within the process control system 10.

As will be understood, the MPC or advanced control logic generation routines and methods described herein enable a user to create advanced control blocks such as MPC control blocks, neural network modeling or control blocks, etc. without having a great deal of expert knowledge about how those blocks are created and enables an operator to create and use an advanced control block without performing a lot of reprogramming of the process to implement advanced control. Also, because the advanced control block is created using the same programming paradigm as the other control elements within the system, the user can be provided consistent views of the process or graphical displays of the process having the advanced control block therein. Still further, because the process model is needed to be created for, for example, an MPC function block, this process model can be used to produce simulation function blocks which can be used to simulate the process for other purposes such as testing, training, detecting process/process-model mismatch or producing virtual outputs of the process for use in controlling a process.

While the advanced control blocks, the process simulation blocks and the associated generation and testing routines have been described herein as being used in conjunction with Fieldbus and standard 4-20 madevices, they can, of course, be implemented using any other process control communication protocol or programming environment and may be used with any other types of devices, function blocks or controllers. Moreover, it is noted that the use of the expression "function block" herein is not limited to what the Fieldbus protocol or the DeltaV controller protocol identifies as a function block but, instead, includes any other type of block, program, hardware, firmware, etc., associated with any type of control system and/or communication protocol that can be used to implement some process control function. Also, while function blocks typically take the form of objects within an object oriented programming environment, this need not be the case.

Although the advanced control blocks, the execution rate compensation blocks, the process simulation blocks and the associated generation and testing routines described herein are preferably implemented in software, they may be implemented in hardware, firmware, etc., and may be executed by any other processor associated with a process control system. Thus, the routine 140 described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc. (which is viewed as being the same as or interchangeable with providing such software via a transportable storage medium).

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control element adapted to be used as a portion of a process control routine implemented on a processor to control a process, the process control element comprising:

a computer readable medium; and a control block stored on the computer readable medium and adapted to be executed on the processor to implement control of the process, the control block including, a first plurality of inputs, wherein each input is adapted to receive a different one of a set of process parameters;

a second plurality of outputs, wherein each output is adapted to be communicatively coupled to a different process input for controlling the set of process parameters;

control logic responsive to the first plurality of inputs to produce a control signal at each of the second plurality of outputs; and an execution rate block adapted to receive values of a parameter related to the process and to compute an execution rate for the control logic based on the parameter.

2. The process control element of claim 1, wherein the execution rate block includes a filter adapted to filter the parameter.

3. The process control element of claim 2, wherein the execution rate block further includes a computation block that determines the execution rate for the control logic based on the filtered parameter.

4. The process control element of claim 3, further including a limiter adapted to limit the execution rate determined by the computation block.

5. The process control element of claim 1, wherein the execution rate block includes a computation block that determines the execution rate for the control logic as a linear function of the parameter.

6. The process control element of claim 1, wherein the execution rate block includes a computation block that determines the execution rate for the control logic as a non-linear function of the parameter.

7. The process control element of claim 1, wherein the execution rate block is further adapted to receive values of a second parameter and to determine the execution rate of the logic block as a function of the parameter and the second parameter.

8. The process control element of claim 1, wherein the execution rate block is adapted to receive the parameter indicative of process throughput and to determine the execution rate of the control logic based on values of the process throughput.

9. The process control element of claim 1, wherein the control logic includes model predictive control logic.

10. The process control element of claim 1, wherein the control logic includes neural network control logic.

11. A process controller adapted to control a process having a plurality of field devices, the process controller comprising:

a processor;

a memory;

a control block stored on the memory and adapted to be executed by the processor to perform control calculations to produce one or more control signals for controlling the process, the control block being adapted to execute on the processor at an execution rate; and an execution rate block stored on the memory and adapted to be executed on the processor to determine the execution rate of the control block based on a value of a parameter associated with the process.

12. The process controller of claim 11, wherein the execution rate block includes a filter adapted to filter the parameter associated with the process.

13. The process controller of claim 12, wherein the execution rate block further includes a computation block that determines the execution rate for the control block based on the filtered value of the parameter.

14. The process controller of claim 13, further including a limiter adapted to limit the execution rate determined by the computation block.

15. The process controller of claim 11, wherein the execution rate block includes a computation block that determines the execution rate for the control block as a linear function of the parameter.

16. The process controller of claim 11, wherein the execution rate block includes a computation block that determines the execution rate for the control block as a non-linear function of the parameter.

17. The process controller of claim 11, wherein the execution rate block is further adapted to determine the execution rate of the control block as a function of the parameter and a second parameter.

18. The process controller of claim 11, wherein the execution rate block is adapted to determine the execution rate of the control block based on a value associated with process throughput.

19. The process controller of claim 11, wherein the control block is adapted to perform model predictive control.

20. The process controller of claim 11, wherein the control block is a multiple input/multiple output control block.

21. The process controller of claim 20, wherein the control block is adapted to perform neural network control logic.

22. A process control element adapted to be used to assist in controlling a process having a process control system that executes a control block on a processor at an execution rate to perform process control functions within the process, the process control element comprising:

a memory; and an execution rate block stored on the memory and adapted to be executed on the processor to determine the execution rate of the control block during operation of the process based on values of a parameter associated with the process.

23. The process control element of claim 22, wherein the execution rate block includes a filter adapted to filter the parameter associated with the process.

24. The process control element of claim 23, wherein the execution rate block further includes a computation block that determines the execution rate for the control block based on the filtered value of the parameter.

25. The process control element of claim 24, wherein the execution rate block further includes a limiter adapted to limit the execution rate determined by the computation block.

26. The process control element of claim 22, wherein the execution rate block includes a computation block that determines the execution rate for the control block as a linear function of the parameter.

27. The process control element of claim 22, wherein the execution rate block includes a computation block that determines the execution rate for the control block as a non-linear function of the parameter.

28. The process control element of claim 22, wherein the execution rate block is further adapted to determine the execution rate of the control block as a function of the parameter and a second parameter.

29. A method of controlling a process having process delay that is a function of a parameter, the method comprising the steps of:

executing, at an execution rate, a control block that implements multiple input/multiple output control during operation of the process;

obtaining an indication of the parameter; and determining the execution rate of the control block as a function of the indication of the parameter.

30. The method of claim 29, wherein the step of obtaining includes the step of measuring the parameter during operation of the process.

31. The method of claim 29, wherein the step of obtaining includes the step of determining a throughput of the process.

32. The method of claim 29, wherein the step of obtaining includes the step of determining a feed rate of the process.

33. The method of claim 29, wherein the step of executing includes the step of executing a control block that implements model predictive control at the execution rate.

34. The method of claim 29, wherein the step of determining includes the step of filtering the measured parameter.

35. The method of claim 34, wherein the step of determining further includes the step of calculating the execution rate and limiting the calculated execution rate.

36. The method of claim 29, wherein the step of determining includes the step of determining the execution rate as a linear function of the parameter.

37. The method of claim 29, wherein the step of determining includes the step of determining the execution rate as a non-linear function of the parameter.

38. The method of claim 29, further including the step of obtaining an indication of a second parameter and wherein the step of determining includes the step of determining the execution rate as function of the indication of the parameter and the indication of the second parameter.

39. The method of claim 29, wherein the step of obtaining includes the step of determining a dead time associated with the process.

* * * * *

UNITED STATES PATENT AND TRADEMARK OFFICE
CERTIFICATE OF CORRECTION

PATENT NO. : 6,901,300 B2
DATED : May 31, 2005
INVENTOR(S) : Terrence L. Blevins et al.

It is certified that error appears in the above-identified patent and that said Letters Patent is hereby corrected as shown below:

Column 6,
Line 55, insert -- of -- immediately before "an".

Column 17,
Line 36, delete "is" and insert -- if --.

Column 18,
Line 5, insert -- be -- immediately before "described".

Column 19,
Line 1, delete "therefor" and insert -- therefore --.
Line 33, delete "madevices" and insert -- ma devices --.
Line 46, insert -- the -- immediately before "case".

Column 21,
Line 46, delete "clement" and insert -- element --.

Column 22,
Line 53, insert -- a -- immediately before "function".

Signed and Sealed this

Eighth Day of November, 2005

JON W. DUDAS
*Director of the United States Patent and Trademark Office*